(12) United States Patent
Isaki et al.

(10) Patent No.: US 6,627,308 B2
(45) Date of Patent: Sep. 30, 2003

(54) RELEASE FILM

(75) Inventors: Kimihiro Isaki, Shiga-ken (JP); Masashi Inagaki, Shiga-ken (JP)

(73) Assignee: Mitsubishi Polyester Films Corporation, Tokyo (JP)

( * ) Notice: Subject to any disclaimer, the term of this patent is extended or adjusted under 35 U.S.C. 154(b) by 0 days.

(21) Appl. No.: 09/825,442

(22) Filed: Apr. 3, 2001

(65) Prior Publication Data

US 2002/0009586 A1 Jan. 24, 2002

(30) Foreign Application Priority Data

Apr. 4, 2000 (JP) ........................................ 2000-101975
Jun. 15, 2000 (JP) ........................................ 2000-179267

(51) Int. Cl.$^7$ ........................ B32B 27/30; B32B 27/36
(52) U.S. Cl. ........................ 428/337; 428/451; 428/483; 428/910
(58) Field of Search .................................. 428/451, 483, 428/910, 337

(56) References Cited

FOREIGN PATENT DOCUMENTS

| EP | 0445744 | 9/1991 |
| EP | 0635358 | 1/1995 |
| JP | 9156060 | 6/1997 |
| JP | 2000062122 | 2/2000 |

OTHER PUBLICATIONS

European Search Report Feb. 18, 2002.

*Primary Examiner*—D. S. Nakarani
(74) *Attorney, Agent, or Firm*—David G. Conlin; Christine C. O'Day; Edwards & Angell, LLP

(57) ABSTRACT

The present invention relates to a release film comprising:
 a polyester film;
 a coating layer formed on one surface of said polyester film; and
 a release layer formed on a surface of said coating layer which exhibits a residual adhesion rate of not less than 80%,
 said release film satisfying all of the conditions represented by the following formulae (1) to (3):

$$OL \leq 0.6 \quad (1)$$

$$TL \geq 80 \quad (2)$$

$$TL(H) \leq 8 \quad (3)$$

wherein OL is an amount (mg/m$^2$) of oligomers extracted with dimethylformamide from a surface of said release layer after the release film is heat-treated at a temperature of 180° C. for 10 minutes; TL is a total light transmittance (%) of said release film; and TL(H) is a total light transmittance (%) of a laminate prepared by interposing said release film between two polarizing plates disposed in a perpendicular relation to each other.

7 Claims, No Drawings

RELEASE FILM

BACKGROUND OF THE INVENTION

The present invention relates to a release film, and more particularly, it relates to a release film for protecting an adhesive layer of a polarizing plate used in a liquid crystal display (hereinafter occasionally referred to merely as "LCD").

Hitherto, release films made of a polyester film as a base material have been used to protect an adhesive layer of a polarizing plate used in LCD. However, these release films tend to cause various inconveniences upon use due to oligomers precipitated on the surface of a release layer thereof when exposed to a high temperature during the production process.

The oligomers precipitated on the surface of the release layer are readily transferred to the surface of an adhesive layer formed on a counterpart member to which the release film is attached, e.g., a polarizing plate. When the polarizing plate having such an adhesive layer on which the oligomers are transferred, is attached onto a glass plate, the obtained LCD tends to cause problems such as deteriorated brightness.

The production process of the polarizing plate for LCD includes steps of attaching the polarizing plate and the release film through the adhesive layer and winding up the resultant laminate into a roll, or the like. In the production process of the polarizing plate, it is considered that the oligomers are precipitated during the drying step after applying an adhesive thereonto.

In recent years, there is a tendency that the brightness of a display surface of LCD is increased in order to enhance a visibility thereof. As a result, the above problems more significantly affect the performance of LCD.

Further, in order to increase the productivity and reduce the production costs, it has been demanded to conduct the production process at a high speed. For this reason, a higher temperature tends to be used in the drying step, so that the above precipitation of oligomers is more likely to occur.

On the other hand, in the inspection step of the polarizing plate for LCD which is accompanied with optical evaluations of display performance, color tone, contrast, inclusion of foreign materials or the like, it has been conventionally attempted to prevent overlooking or detection error of defective products when inspected visually or by a magnifying glass. However, in such a case, there tend to be caused problems such as failure to detect foreign materials contained in the release film due to the optical anisotropy of the polyester base film thereof. Therefore, it has been required to temporarily peel the release film from the polarizing plate upon inspection, and attaching the release film again thereonto after the inspection.

As a result of the present inventors' earnest studies to solve the above problems, it has been found that by using a polyester film which is successively provided on the surface thereof with a coating layer and a release layer, and which exhibits a specific oligomer content, retardation value and total light transmittance, the obtained release film is free from the above-described problems. The present invention has been attained based on the above finding.

SUMMARY OF THE INVENTION

An object of the present invention is to provide a release film which is excellent in handling property when used for protecting an adhesive layer of a polarizing plate for LCD, is capable of minimizing an amount of oligomers precipitated and exhibiting a good transparency, and allows facilitated inspection including optical evaluations.

To attain the above aim, in a first aspect of the present invention, there is provided a release film comprising:

a polyester film;

a coating layer formed on one surface of said polyester film; and a release layer formed on a surface of said coating layer which exhibits a residual adhesion rate of not less than 80%, said release film satisfying all of the conditions represented by the following formulae (1) to (3):

$$OL \leq 0.6 \quad (1)$$

$$TL \geq 80 \quad (2)$$

$$TL(H) \leq 8 \quad (3)$$

wherein OL is an amount (mg/m$^2$) of oligomers extracted with dimethylformamide from a surface of said release layer after the release film is heat-treated at a temperature of 180° C. for 10 minutes; TL is a total light transmittance (%) of said release film; and TL(H) is a total light transmittance (%) of a laminate prepared by interposing said release film between two polarizing plates disposed in a perpendicular relation to each other.

In a second aspect of the present invention, there is provided a release film for the protection of an adhesive layer formed on a polarizing plate for a liquid crystal display, comprising:

a biaxially stretched polyester film having a thickness of 9 to 50 μm;

a coating layer containing polyvinyl alcohol which is formed on one surface of said polyester film; and a release layer formed on a surface of said coating layer, said release film satisfying all of the conditions represented by the following formulae (1) to (3):

$$OL \leq 0.6 \quad (1)$$

$$30 \leq Re \leq 10,000 \quad (2)$$

$$TL \geq 80 \quad (3)$$

wherein OL is an amount (mg/m$^2$) of oligomers extracted with dimethylformamide from a surface of said release layer after the release film is heat-treated at a temperature of 150° C. for 10 minutes; Re is a retardation value (nm) of said biaxially stretched polyester film; and TL is a total light transmittance (%) of said release film.

DETAILED DESCRIPTION OF THE INVENTION

The present invention will be described in detail below.

In the present invention, polyesters used for the biaxially stretched polyester film may be either homopolyesters or copolyesters.

As the homopolyesters, there may be exemplified those obtained by the polycondensation of an aromatic dicarboxylic acid and an aliphatic glycol. Examples of the aromatic dicarboxylic acids may include terephthalic acid, 2,6- naphthalene dicarboxylic acid or the like. Examples of the aliphatic glycols may include ethylene glycol, diethylene glycol, 1,4-cyclohexane dimethanol or the like. Typical examples of the homopolyesters may include polyethylene terephthalate (PET), polyethylene-2,6-naphthalene dicarboxylate (PEN) or the like.

As the copolyesters, there may be exemplified copolymers containing, in addition to the above components, a third component in an amount of not more than 30 mol %. Examples of the dicarboxylic acid components of the copolyesters may include isophthalic acid, phthalic acid, terephthalic acid, 2,6-naphthalene dicarboxylic acid, adipic acid, sebacic acid, oxycarboxylic acids such as, e.g., p-oxybenzoic acid, or the like. These dicarboxylic acid components may be used alone or in the form of a mixture of any two or more thereof. Examples of the glycol components of the copolyesters may include ethylene glycol, diethylene glycol, propylene glycol, butane diol, 1,4-cyclohexane dimethanol, neopentyl glycol or the like. These glycol components may be used alone of in the form of a mixture of any two or more thereof.

The polyesters described herein may involve polyethylene terephthalates containing ethylene terephthalate units in an amount of usually not less than 80 mol %, preferably not less than 90 mol %, polyethylene-2,6-naphthalates containing ethylene-2,6-naphthalate units in an amount of usually not less than 80 mol %, preferably not less than 90 mol %, or the like.

The biaxially stretched polyester film preferably contains particles in order to mainly impart a good sliding property thereto. The kinds of particles blended are not particularly restricted as long as the particles added is capable of imparting a good sliding property to the polyester film. Specific examples of the particles blended may include silica, calcium carbonate, magnesium carbonate, barium carbonate, calcium sulfate, calcium phosphate, magnesium phosphate, silicon oxide, kaolin, aluminum oxide, titanium oxide or the like.

Further, the heat-resistant organic particles described in Japanese Patent Publication (KOKOKU) No. 59-5216 (1984), Japanese Patent Application Laid-Open (KOKAI) No. 59-217755(1984), etc., may also be blended in the polyester film. Examples of the other heat-resistant organic particles may include thermosetting urea resins, thermosetting phenol resins, thermosetting epoxy resins, benzoguanamine resins or the like. Furthermore, particles produced by precipitating and finely dispersing a part of metal compounds such as catalysts during the polyester production process may also be blended in the polyester film.

In addition, the shape or configuration of the particles blended is not particularly restricted, and any of spherical, massive, bar-like or flat particles may be used in the present invention. Also, the hardness, specific gravity and color of the particles are not particularly restricted. These particles may be used in the form of a mixture of any two or more thereof, if required.

The particles blended in the polyester film have an average particle size of usually 0.01 to 3 $\mu$m, preferably 0.01 to 1 $\mu$m. When the average particle size of the particles is less than 0.1 $\mu$m, the particles tend to be agglomerated, resulting in insufficient dispersion thereof. When the average particle size of the particles is more than 3 $\mu$m, the surface roughness of the obtained film is too coarse, so that it may be difficult to apply the release layer thereon in the subsequent step.

The content of the particles in the polyester film is preferably in the range of 0.1 to 5% by weight, more preferably 0.1 to 3% by weight. When the content of the particles is less than 0.1% by weight, it may be difficult to impart a sufficient sliding property to the film. When the content of the particles is more than 5% by weight, the obtained polyester film tends to be deteriorated in transparency.

The method of blending the particles into the polyester film is not particularly restricted, and any known suitable methods may be used in the present invention. For example, the particles may be added at any optional stage of the polyester production process. Preferably, the polycondensation reaction may proceed after adding the particles at the esterification stage or after completion of the transesterification reaction.

In addition, there may also be used the method of blending raw materials of polyester with a slurry prepared by dispersing the particles in ethylene glycol or water using a vented kneading extruder, the method of blending the raw materials of polyester with the dried particles, or the like.

The polyester film of the present invention may further contain, if required, various additives such as antioxidants, heat stabilizers, lubricants, dyes and pigments.

Next, the release film according to the first aspect of the present invention will be explained below.

The thickness of the polyester film used in the release film according to the first aspect of the present invention, is not particularly restricted as long as the formation of such a polyester film is possible, and is usually in the range of 9 to 150 $\mu$m, preferably 12 to 100 $\mu$m, more preferably 18 to 75 $\mu$m.

Then, the process for producing the polyester film used in the release film according to the first aspect of the present invention will be specifically explained below. However, it is not intended to limit the present invention thereto.

First, the above-described raw materials of polyester are melt-extruded into a sheet through a die, and then cooled and solidified by a cooling roll (rotary cooling drum), thereby obtaining an unstretched film.

In this case, in order to improve a surface flatness of the sheet, it is required to enhance the adhesion between the sheet and the rotary cooling drum. For this purpose, the use of an electrostatic pinning method and/or a liquid-coating adhesion method is preferred.

The angle ($\theta_3$) of an in-plane main orientation axis of the polyester film used in the release film of the present invention relative to the machine direction (MD) is preferably not less than 70°. The method of stretching the polyester film is not particularly restricted. As the preferred stretching methods, there may be exemplified a successive biaxially stretching method, a simultaneous biaxially stretching method or the like.

In the successive biaxially stretching method, the above unstretched film is first stretched in one direction using a roll- or tenter-type stretching machine. The stretching temperature is usually 70 to 120° C., preferably 80 to 110° C. The stretch ratio is usually 2.5 to 7 times, preferably 3.0 to 6 times. The thus obtained monoaxially stretched film is then stretched in the direction perpendicular to the above first stretching direction. The stretching temperature is usually 70 to 120° C., preferably 80 to 115° C. The stretch ratio is usually 3.0 to 7 times, preferably 3.5 to 6 times. Successively, the thus obtained film is heat-treated at a temperature of 170 to 250° C. under tension or under 30% or less relaxed condition, thereby obtaining a biaxially stretched film.

In the above successive stretching method, the stretching operation in each direction may be performed at two or more stages. In such a case, the stretch operations may be preferably controlled such that the total stretch ratio in each direction lies within the above-specified range. In addition, before or after the heat treatment, the film may be stretched again in the longitudinal (machine) and/or transverse (width) directions, if required.

In the simultaneous stretching method, the above unstretched film is simultaneously stretched in both the machine and width directions while controlling the temperature of the unstretched film to usually 70 to 120° C., preferably 80 to 110° C. The stretch ratio is usually in the range of 4 to 50 times, preferably 7 to 35 times, more preferably 10 to 20 times when calculated as the area ratio. Successively, the thus obtained film is heat-treated at a temperature of 170 to 250° C. under tension or under 30% or less relaxed condition, thereby obtaining a biaxially stretched film.

During the above stretching process, the polyester film may be surface-treated, i.e., subjected to so-called in-line coating. For example, in the case of the successive stretching process, the in-line coating of the film may be performed after completion of the first stretching stage and before initiation of the second stretching stage, though not limited thereto.

Thus, in the case where a coating layer is formed on the polyester film by the in-line coating method during the stretching process, it is possible not only to stretch and surface-coat the polyester film at the same time, but also to reduce the thickness of the obtained coating layer according to the stretch ratios, thereby enabling the production of films suitable as the polyester film of the present invention.

In the release film of the present invention, the binder polymers used in the coating layer formed on the polyester film are not particularly restricted. Specific examples of the binder polymers may include polyvinyl alcohol, polyacrylamide, polyalkylene glycols, polyalkylene imines, methyl cellulose, hydroxy cellulose, starches, polyurethanes, polyesters, polyacrylates, chlorine-based polymers such as polyvinyl chloride and vinyl chloride-vinyl acetate copolymer, polyolefins or the like.

In the above in-line coating and stretching process, among these binder polymers, the organic polymers usable in the form of nonionic, cationic or amphoteric aqueous solution or aqueous dispersion, are preferred. Further, among these organic polymers, the use of polyurethanes, polyesters and polyacrylates is especially preferred because these polymers exhibit a high adhesion to a top-coating layer. The organic polymers are rendered hydrophilic and water-dispersible by copolymerizing a nonionic, cationic or amphoteric hydrophilic component as one monomer therewith.

In the release film of the first aspect of the present invention, the amount of oligomers extracted with dimethylformamide from the surface of the release layer after the release film is heat-treated at 180° C. for 10 minutes, is required to be not more than 0.6 mg/m$^2$. To meet the above requirement, it is preferred to incorporate polyvinyl alcohol into the coating layer of the release film.

The amount of the polyvinyl alcohol (hereinafter referred to merely as "PVA") contained in the coating layer is not particularly restricted, and is preferably in the range of 10 to 100% by weight, more preferably 20 to 90% by weight, most preferably 30 to 80% by weight. When the content of the PVA is less than 10% by weight, the effect of preventing the precipitation of oligomers tends to become insufficient.

The degree of polymerization of the PVA used is not particularly restricted, and is usually not less than 100, preferably 300 to 40,000.

The percentage of saponification of the PVA used is not particularly restricted, and is usually 70 to 99.9 mol %, preferably 80 to 99.9 mol %. Specifically, saponified products of vinyl acetate or the like may be exemplified.

Also, the coating layer may further contain a cross-linking agent. Specific examples of the cross-linking agents may include methylolated or alkylolated urea-based, melamine-based, guanamine-based, acrylamide-based or polyamide-base compounds, epoxy compounds, aziridine compounds, block polyisocyanates, silane coupling agents, titanium coupling agents, zircoaluminate coupling agents or the like. These cross-linking components may be previously bonded to the binder polymer.

Also, the coating layer may further contain inorganic particles in order to improve the anchoring property or sliding property thereof. Specific examples of the inorganic particles may include silica, alumina, kaolin, calcium carbonate, titanium oxide, barium salts or the like. Furthermore, the coating layer may also contain, if required, various additives such as defoaming agents, coatability-improving agents, thickeners, organic lubricants, organic polymer particles, antioxidants, ultraviolet light absorbers, foaming agents, dyes or the like.

In the release film of the present invention, the amount of the coating layer applied (after drying) is in the range of usually 0.01 to 1 g/m$^2$, preferably 0.03 to 0.5 g/M$^2$. When the amount of the coating layer applied is less than 0.01 g/m$^2$, the obtained coating layer tends to fail to have a uniform thickness. When the amount of the coating layer applied is more than 1 g/m$^2$, the obtained coating layer tends to be deteriorated in sliding property or the like.

In the present invention, in order to form the coating layer, there may be used the same known coating methods as used for the formation of the release layer as described below, such as bar coating method, gravure coating method or the like.

The release layer of the release film according to the present invention preferably contains a curing-type silicone resin in order to impart a good releasing property thereto. As the curing-type silicone resins, there may be used resins containing the curing-type silicone resin as a main component, or silicone resins modified by graft-polymerizing organic resins such as urethane resins, epoxy resins or alkyd resins thereto.

The curing-type silicone resins may be of any curing type such as addition-reaction type, condensation type, ultraviolet curing type, electron beam curing type, non-solvent type or the like.

Specific examples of the curing-type silicone resins may include commercially available products such as KS-774, KS-775, KS-778, KS-779H, KS-847H, KS-856, X-62-2422, X-62-2461, X-62-5039 and X-62-5040 produced by Shin-Etsu Kagaku Kogyo Co., Ltd.; DKQ3-202, DKQ3-203, DKQ3-204, DKQ3-205 and DKQ3-210 produced by Dow Corning Asia Co., Ltd.; YSR-3022, TPR-6700, TPR-6720 and TPR-6721 produced by Toshiba Silicone Co., Ltd.; SD7220, SD7226 and SD7229 produced by Toray Dow Corning Co., Ltd.; or the like. The curing-type silicone resins may also be used in combination with a release-controlling agent in order to appropriately control a releasing property of the release layer, etc.

In the release film of the present invention, it is preferred to further incorporate tetrafunctional siloxane structural units into the release layer thereof containing the above curing-type silicone resin, because the effect of preventing the precipitation of oligomers can be further enhanced thereby.

In general, the siloxane structures may be classified into four types as shown in the following general formula (A):

$$R_mSiO_{(4-m/2)} \tag{A}$$

wherein R is a substituted or unsubstituted hydrocarbon group having a carbon atom directly bonded to the silicon atom and exhibiting no radical polymerizability; and m is an integer of 0 to 3.

In the above general formula (A), when m is not less than 1 (monofunctional: M unit; difunctional: D unit; and tri-functional: T unit), the release layer itself of the obtained release film is poor in effect of preventing the precipitation of oligomers. For example, when the release film is heat-treated at a higher temperature in the drying step after applying an adhesive thereto, the amount of oligomers precipitated on the surface of the release layer will be further increased in some cases.

On the contrary, when the release layer of the release film contains the siloxane structural units represented by the general formula (A) where m is 0, i.e., tetrafunctional siloxane structural units (hereinafter occasionally referred to merely as "Q unit"), the precipitation of oligomers on the release layer can be more effectively prevented since the release layer forms a denser coating film.

In order to incorporate the Q siloxane structural units into the release layer, there may be used the method of adding silicone-based compounds having the Q siloxane structural units, into the curing-type silicone resin. The silicone-based compounds may be, for example, of a reactive resin type.

In the release film of the present invention, the release layer thereof preferably contains the silicone-based compounds having the Q units therein in an amount of not less than 10% by weight, more preferably not less than 20% by weight. When the silicone-based compounds is contained in such an amount, the obtained release layer can be further enhanced in effect of preventing the precipitation of oligomers thereon. When the content of the silicone-based compounds having the Q units is less than 10% by weight, the obtained release layer sometimes fails to show a sufficient effect of preventing the precipitation of oligomers.

In the present invention, in order to form the release layer on the polyester film, there may be used known coating methods such as reverse roll coating method, gravure coating method, bar coating method and doctor blade coating method.

The coating amount of the release layer is usually in the range of 0.01 to 1 g/m², preferably 0.03 to 0.5 g/m² from the standpoint of a good coatability. When the coating amount of the release layer is less than 0.01 g/m², it is difficult to perform a stable coating operation for forming the release layer, thereby sometimes failing to obtain a uniform coating layer. When the coating amount of the release layer is more than 1 g/m², the release layer itself is sometimes deteriorated in adhesion property, curing property or the like.

On the back surface of the release film opposite to its surface where the release layer is formed, there may be provided a further coating layer such as an adhesive layer, an anti-static layer, a layer for preventing the precipitation of oligomers or the like. Further, the polyester film may be subjected to surface-treatments such as corona treatment and plasma treatment.

The amount of oligomers (OL) extracted with dimethylformamide from the surface of the release layer after the release film is heat-treated at 180° C. for 10 minutes, is not more than 0.6 mg/m², preferably not more than 0.4 mg/m². In the case where the OL is more than 0.6 mg/m², the amount of oligomers precipitated on the surface of the release layer becomes large when a higher drying temperature is used in the drying step after applying an adhesive layer. As a result, when such a release layer is used for protecting the adhesive layer applied onto the polarizing plate for LCD, the adhesive layer tends to be deteriorated in transparency, adhesive strength or the like.

The release film of the present invention exhibits a total light transmittance (TL(H)) of not more than 8%, preferably not more than 5%, more preferably not more than 2% when measured with respect to a laminate prepared by interposing said release film between two polarizing plates disposed in a perpendicular relation to each other. When the TL(H) is more than 8%, problems such as non-uniform polarization may be caused due to the optical anisotropy of the polyester film of the release film at the inspection step of the polarizing plate for LCD.

The release film of the present invention preferably satisfies such a requirement that the angle ($\theta_3$) of an in-plane main orientation axis of the polyester film relative to the machine direction (MD) is not less than 70°, more preferably not less than 80°. When the angle ($\theta_3$) is less than 70°, the inclusion of foreign materials tends to be overlooked at the inspection step including optical evaluations. As a result, it is required to temporarily peel the release film from the polarizing plate before the inspection step, and then attaching the release film again thereonto after completion of the inspection.

Next, the release film according to the second aspect of the present invention will be explained below.

The biaxially stretched polyester film of the release film according to the second aspect of the present invention, is required to have a thickness of 9 to 50 μm, preferably 12 to 40 μm from the standpoint of workability and handling property thereof. When the thickness is less than 9 μm, the biaxially stretched polyester film tends to be deteriorated in handling property. On the other hand, when the thickness is more than 50 μm, various inconveniences such as increase in the retardation value tend to be caused when the polarizing plate for LCD is subjected to inspections including optical evaluations with respect to display performance, color tone, contrast, inclusion of foreign materials or the like.

Further, the biaxially stretched polyester film of the release film according to the second aspect of the present invention, is required to have, in addition to the above specified thickness, a retardation (Re) value of 30 to 10,000 nm, preferably 50 to 5000 nm, more preferably 100 to 2,000 nm. When the Re value is less than 30 nm, the obtained film tends to be deteriorated in chemical resistance. When the Re value is more than 10,000 nm, so-called "cross nicol" condition (extinction condition) is caused between the polarizing plate and the release film depending upon the angle ($\theta_3$), SO that various inconveniences such as overlooking of the inclusion of foreign materials tends to be caused upon the optical inspection.

Next, the process for producing the biaxially stretched polyester film of the release film according to the second aspect of the present invention, will be specifically explained below. However, it is not intended to limit the present invention thereto.

First, the above-described raw materials of polyester are melt-extruded into a sheet through a die, and then cooled and solidified by a cooling roll (rotary cooling drum), thereby obtaining an unstretched film.

In this case, in order to improve a surface flatness of the sheet, it is suitable to enhance the adhesion between the sheet and the rotary cooling drum. For this purpose, the use of an electrostatic pinning method and/or a liquid-coating adhesion method is preferred.

Then, the thus obtained unstretched film is biaxially stretched. Namely, the unstretched film is first stretched in one direction using a roll- or tenter-type stretching machine. The stretching temperature is usually 130 to 170° C. The stretch ratio is usually 2.5 to 7 times, preferably 3.0 to 6 times. The thus obtained monoaxially stretched film is then stretched in the direction perpendicular to the above first stretching direction. The stretching temperature is usually 130 to 170° C. The stretch ratio is usually 3.0 to 7 times, preferably 3.5 to 6 times. Successively, the thus obtained film is heat-treated at a temperature of 180 to 270° C. under tension or under 30% or less relaxed condition, thereby obtaining a biaxially stretched film. During the above stretching process, the polyester film may be surface-treated, i.e., subjected to so-called in-line coating. For example, the in-line coating of the film may be performed after completion of the first stretching stage and before initiation of the second stretching stage, though not limited thereto.

In the above stretching process, the stretching operation in each direction may be performed at two or more stages. In such a case, the stretch operations may be preferably controlled such that the total stretch ratio in each of the two directions lies within the above-specified range. Alternatively, the above unstretched film may be simultaneously stretched in both the directions such that the stretch ratio lies in the range of 10 to 40 times when calculated as the area ratio. In addition, before or after the above heat treatment, the film may be stretched again in the longitudinal (machine) direction and/or transverse (width) direction, if required.

In the case where the coating layer is formed on the polyester film by the above in-line coating method, it is possible not only to stretch and surface-coat the polyester film at the same time, but also to reduce the thickness of the obtained coating layer according to the stretch ratios, thereby enabling the production of films suitable as the polyester film of the present invention.

In the release film of the present invention, a polyvinyl alcohol-containing coating layer is formed on the polyester film in order to control the amount of oligomers extracted with dimethylformamide from the surface of the release layer after heat-treating the release film at 150° C. for 10 minutes, to not more than 0.6 mg/m$^2$. Such a coating layer is preferably formed on the polyester film by the above-described in-line coating method.

The content of the polyvinyl alcohol (hereinafter referred to merely as "PVA") in the coating layer of the release film according to the present invention is not particularly restricted, and is preferably in the range of 10 to 100% by weight, more preferably 20 to 90% by weight, especially preferably 30 to 80% by weight. When the content of the PVA is less than 10% by weight, the effect of preventing the precipitation of oligomers tends to become insufficient.

The degree of polymerization of the PVA used is not particularly restricted, and is usually not less than 100, preferably 300 to 40,000.

The percentage of saponification of the PVA used is not particularly restricted, and is usually 70 to 99.9 mol %, preferably 80 to 99.9 mol %. Specifically, saponified products of vinyl acetate or the like may be exemplified.

The coating layer of the release film according to the present invention may further contain other binder polymers in addition to the above PVA unless the addition of these binder polymers adversely affects the aimed effects of the present invention. The binder polymers may be the same as those used in the release film according to the first aspect of the present invention.

Also, the PVA-containing coating layer may further contain a cross-linking agent. Specific examples of the cross-linking agents may include those exemplified for the release film according to the first aspect of the present invention. These cross-linking components may be previously bonded to the binder polymer.

Also, the PVA-containing coating layer may further contain inorganic particles in order to improve the anchoring property or sliding property thereof. Specific examples of the inorganic particles may include silica, alumina, kaolin, calcium carbonate, titanium oxide, barium salts or the like. Furthermore, the coating layer may also contain, if required, various additives such as defoaming agents, coatability-improving agents, thickeners, organic lubricants, organic polymer particles, antioxidants, ultraviolet light absorbers, foaming agents, dyes or the like.

In the release film of the present invention, the amount of the PVA-containing coating layer applied is preferably in the range of 0.01 to 5 g/m$^2$, more preferably 0.02 to 1 g/m$^2$. When the amount of the coating layer applied is less than 0.01 g/m$^2$, the obtained coating layer sometimes fails to have a uniform thickness. On the other hand, when the amount of the coating layer applied is more than 5 g/m$^2$, the obtained coating layer tends to be deteriorated in sliding property.

In the present invention, in order to form the PVA-containing coating layer on the polyester film, there may be used the same known coating methods as used for the formation of the release layer as described below, such as bar coating method, gravure coating method or the like.

The release layer of the release film according to the present invention is not particularly restricted as long as such a material capable of imparting a good releasing property thereto is contained therein. Among them, the release layer preferably contains a curing-type silicone resin because the resin can impart a high releasing property thereto. As the curing-type silicone resins, there may be used resins containing the curing-type silicone resin as a main component, or silicone resins modified by graft-polymerizing organic resins such as urethane resins, epoxy resins or alkyd resins thereto.

The curing-type silicone resins may be of any curing reaction type such as addition-reaction type, condensation type, ultraviolet curing type, electron beam curing type, non-solvent type or the like. Specific examples of the curing-type silicone resins may include those exemplified for the release film according to the first aspect of the present invention. The curing-type silicone resins may also be used in combination with a release-controlling agent in order to appropriately control the releasing property of the release layer, or the like.

In the present invention, in order to form the release layer on the biaxially stretched polyester film, there may be used known coating methods such as reverse roll coating method, gravure coating method, bar coating method and doctor blade coating method.

The coating amount of the release layer is preferably in the range of 0.01 to 5 g/m$^2$, more preferably 0.01 to 1 g/m$^2$ from the standpoint of a good coatability. When the coating amount of the release layer is less than 0.01 g/m$^2$, it is difficult to perform a stable coating operation for forming the release layer, thereby sometimes failing to obtain a uniform coating layer. When the coating amount of the release layer is more than 5 g/m², the release layer itself is sometimes deteriorated in adhesion property, curing property or the like.

On the back surface of the release film opposite to its surface where the release layer is formed, there may be provided, if required, an additional coating layer such as a layer for preventing the precipitation of oligomers, an adhesive layer, an anti-static layer or the like. Further, the biaxially stretched polyester film may be subjected to surface-treatments such as corona treatment and plasma treatment.

The amount of oligomers (OL) extracted with dimethylformamide from the surface of the release layer after heat-treating the thus obtained release film at 150° C. for 10 minutes, is required to be not more than 0.6 mg/m². When the OL is more than 0.6 mg/m², the amount of oligomers precipitated on the surface of the release layer becomes too large. As a result, when such a release layer is used for protecting the adhesive layer applied onto the polarizing plate for LCD, an adhesive layer formed on the counterpart member to which the release film is attached, tends to be deteriorated in transparency, adhesive strength or the like.

The release film according to each of the first and second aspects of the present invention is required to have a total light transmittance (TL) of not less than 80%. When the TL is less than 80%, the obtained film tends to become insufficient in transparency. As a result, problems such as overlooking of the inclusion of foreign materials may be caused upon conducting the inspections including optical evaluations.

Also, the release film according to each of the first and second aspects of the present invention preferably exhibits a residual adhesion rate of not less than 80%, more preferably not less than 90% in order to prevent the migration and transfer of silicone into the surface of an adhesive layer of the counterpart member to which the release film is attached, or the surface of a transporting roll used in the production process. When the residual adhesion rate is less than 80%, problems such as the above migration and transfer of silicone into the surface of the transporting roll tend to be caused, or the adhesive layer contacting with a releasing surface of the release film tends to be deteriorated in adhesion strength.

Thus, the release film of the present invention is excellent in workability and handling property when used as a protective film for an adhesive layer formed on a polarizing plate for LCD, is capable of minimizing an amount of oligomers precipitated and exhibiting a good transparency, and allows facilitated inspections including optical evaluations. Therefore, the release film of the present invention has a high industrial value.

EXAMPLES

The present invention will be described in more detail by reference to the following examples. However, these examples are only illustrative and not intended to limit the present invention thereto.

The measuring methods used herein are as follows.

(1) Measurement of Intrinsic Viscosity of Polyester:

One gram of polyester was accurately weighed, and dissolved in 100 ml of a mixed solution of phenol and tetrachloroethane (weight ratio: 50/50). The intrinsic viscosity of the obtained solution was measured at 30° C.

(2) Measurement of Average Particle Size ($d_{50}$: μm):

The average particle size was expressed as the particle size at the integrated volume fraction of 50% in the equivalent sphericity distribution determined by a centrifugal precipitation type particle size distribution meter "SA-CP3 Model" (manufactured by Shimadzu Seisakusho Co., Ltd.).

(3) Measurement of Amount of Oligomers (OL) Extracted from the Surface of Release Layer of Release Film:

The release film was heat-treated at a temperature of 150° C. or 180° C. for 10 minutes, and then formed into a top-opened rectangular box having a bottom area of 250 cm². In the case where the release film having a coating layer, the box is formed such that the coating layer faces inside.

Then, the thus formed box was charged with 10 ml of dimethylformamide (DMF), and allowed to stand for 3 minutes. The DMF was recovered from the box and fed to a liquid chromatography "LC-7A" manufactured by Shimadzu Seisakusho Co., Ltd., to determine the amount of oligomers contained in DMF. The amount of oligomers (mg/m²) extracted from the surface of the release layer was expressed by the value obtained by dividing the measured amount of oligomers contained in DMF by the contact area between the film and DMF.

The amount of oligomers contained in DMF was obtained from the ratio between peak areas of a standard specimen and the measured specimen (absolute calibration curve method).

The standard specimen was prepared by accurately weighing a preliminarily sampled oligomer (cyclic trimer) and then dissolving the oligomer in accurately weighed DMF. The concentration of the standard specimen is preferably in the range of 0.001 to 0.01 mg/ml.

Meanwhile, the conditions of the liquid chromatography are as follows.

Mobile phase A: Acetonitrile;

Mobile phase B: 2% acetic acid aqueous solution;

Column: "MCI GEL ODS 1HU" manufactured by Mitsubishi Chemical Corporation;

Column temperature: 40° C.;

Flow rate: 1 ml/min.; and

Detecting wavelength: 254 nm (4) Measurement of Total Light Transmittance (TL) of Release Film:

The total light transmittance (%) of the release film was measured according to JIS-K-7105 using an integrating sphere turbidimeter "NDH-300A" manufactured by Nippon Denshoku Co., Ltd.

(5) Measurement of Angle ($\theta_3$) of In-plane Main Orientation Axis of Polyester Film of Release Film Relative to Machine Direction (MD):

The orientation of the release film was observed by a polarizing microscope manufactured by Carl Zeiss AG. Specifically, the measurement was conducted at 10 points equidistantly spaced in the width direction of the film to determine an inclination angle of an in-plane main orientation axis of the polyester film relative to the machine direction (MD). The angle ($\theta_3$) was expressed by the maximum measured value.

Meanwhile, upon the measurement, when the angle of the main orientation axis relative to MD exceeded 90°, the angle ($\theta_3$) was expressed by a supplementary angle thereof.

(6) Measurement of Total Light Transmittance (TL(H)) of a Laminate Prepared by Interposing Release Film Between Polarizing Plates Disposed Perpendicularly to Each Other:

The total light transmittance (%) of a laminate prepared by interposing the release film between two polarizing plates (manufactured by Nitto Denko Co., Ltd.; polarization rate: 99.99%) which were arranged in perpendicular relation to each other, was measured according to JIS-K-7105 using an integrating sphere turbidimeter "NDH-300A" manufactured by Nippon Denshoku Co., Ltd.

The smaller (TL(H)) value indicates less polarization unevenness and more facilitated inspection of the polarizing plate.

(7) Evaluation of Residual Adhesion Rate of Release Film:
(i) Residual Adhesion Strength:

An adhesive tape No. 31B available from Nitto Denko Co., Ltd., was attached onto a silicone-coated surface of a sample film by pressingly reciprocating 2 kg of a rubber roller thereon at one stroke. The obtained laminate was heat-treated at 100° C. for one hour. Then, the sample film was peeled from the laminate, and the adhesive strength of the adhesive tape No. 31B was measured according to JIS-C-2107 (adhesive strength to a stainless steel plate; 180° peel test method). The measured adhesive strength was regarded as a residual adhesion strength of the adhesive tape.
(ii) Basic Adhesion Strength:

An adhesive tape No. 31B of the same type as used in the above residual adhesion strength measurement was attached under pressure onto a stainless steel plate, and the obtained laminate was measured in the same manner as above according to JIS-C-2107 to determine a basic adhesion strength of the adhesive tape. From the thus measured residual adhesion strength and basic adhesion strength, the residual adhesion rate was calculated according to the following formula:

Residual Adhesion Rate (%)=(Residual adhesion strength)÷(Basic adhesion strength)×100

Meanwhile, the respective measurements were conducted at a temperature of 20±2° C. and a relative humidity (RH) of 65±5%.

(8) Evaluation of Peel Strength (F) of Release Film:

An adhesive double coated tape No. 502 available from Nitto Denko Co., Ltd., was attached at one surface thereof onto a release layer of a sample film to be measured. The obtained laminate was cut into a size of 50 mm×300 mm, allowed to stand at room temperature for one hour, and then tested to measure a peel strength thereof. The peel strength was determined by conducting 180° peel test at a pulling speed of 300 mm/min., using a tensile tester "INTESCO MODEL 2001" manufactured by Intesco Co., Ltd.

(9) Evaluation of Extinction Condition of Release Film:

A release film and a polarizing plate was attached to each other through an adhesive layer onto which foreign materials were adhered, thereby preparing a laminate. The obtained laminate was irradiated with light from the side of the release film to observe an extinction condition thereof.

(10) Evaluation of Facilitated Inspection of Release Film:

A release film and a polarizing plate was attached to each other through an adhesive layer onto which foreign materials were adhered, thereby preparing a laminate. The obtained laminate was irradiated with light from the side of the release film to evaluate visibility of the foreign materials according to the following evaluation criteria:

Good: inspectable (practically usable)

Slightly poor: occasionally difficult to inspect (practically unusable)

Poor: Not inspectable (practically unusable)

(11) Measurement of Thickness of Biaxially Stretched Polyester Film:

The thickness of the film was measured using "MU-METRON 4M-100P TYPE V-2" manufactured by Citizen Tokei Co., Ltd.

(12) Measurement of Retardation (Re) Value of Biaxially Stretched Polyester Film:

Using an Abbe's refractometer manufactured by Atago Kogaku Co., Ltd., the release film was measured at the release layer-side surface thereof to determine a maximum refractive index (nγ) of a base film of the release film as well as a refractive index (nβ) thereof in the direction perpendicular to that of the maximum refractive index. The difference (nγ−nβ) was calculated from the measured values, and magnified by the thickness value of the film to obtain a Retardation value thereof.

(13) Evaluation of Handing Property of Release Film:

The handling property of the release film when attached onto the polarizing plate having an adhesive layer was evaluated according to the following evaluation criteria:

Good: Practically usable

Poor: Practically unusable

Raw polyesters and films used in the following Examples and Comparative Examples were produced as follows.
<Production of Polyester>

Production Example 1

Polyethylene terephthalate A1

A reactor was charged with 100 parts of dimethyl terephthalate, 60 parts of ethylene glycol and 0.09 part of magnesium acetate tetrahydrate, and the contents of the reactor were heated to distil off methanol therefrom, thereby conducting the transesterification reaction therebetween. Four hours after initiation of the transesterification reaction, the reaction mixture was heated to 230° C. to substantially terminate the transesterification reaction. Then, the reactor was further charged with 0.04 part of ethylene glycol slurry of ethyl acid phosphate, 0.03 part of antimony trioxide and 0.3 part of silica particles having an average particle size of 0.25 μm, and then the temperature of the reactor was increased to 280° C. and the pressure thereof was reduced to 15 mmHg, for 100 minutes. Successively, the pressure of the reactor was gradually reduced until it finally reached 0.3 mmHg. After 4 hours, the pressure of the reaction system was returned to ordinary pressure, thereby obtaining polyethylene terephthalate A1 having an intrinsic viscosity of 0.61.

Production Example 2

Polyethylene terephthalate A2

The same procedure as defined in Production Example 1 was conducted except that one part of titanium oxide particles having an average particle size of 0.27 μm were used instead of 0.3 part of the silica particles having an average particle size of 0.25 μm, thereby obtaining polyethylene terephthalate A2.
<Production of Polyester Film>

Production Example 3

Polyester Film F1

The polyethylene terephthalate A1 produced in Production Example 1 was dried at 180° C. for 4 hours in an inert gas atmosphere, melted at 290° C. in an extruder, and then melt-extruded into sheet from a die so as to be attached onto a cooling roll whose surface temperature was set to 40° C., by an electrostatic adhesion method. The thus extruded sheet was cooled and solidified on the cooling roll, thereby obtaining an unstretched film. The thus obtained unstretched film was then stretched 3.5 times in the longitudinal (machine) direction at 85° C.

Then, a coating material having the following composition was applied onto the monoaxially stretched film, and the coated film was introduced into a tenter where the film was stretched 3.7 times in the transverse (width) direction at 100° C. The obtained film was thermally set, and only a 1,000 mm-wide central portion of the film was sampled, thereby obtaining a 25 μm-thick PET film F1 provided with a coating layer in an amount of 0.05 g/m² (after drying).

Compounds of Coating Layer (i) PVA-based Resin: A

Polyvinyl alcohol having a percentage of saponification of 88 mol % and a degree of polymerization of 500

(ii) Water-based Polyester Resin: B

Water-based polyester obtained by copolymerizing polyester composed mainly of isophthalic acid, ethylene glycol and diethylene glycol with a dicarboxylic acid derivative having neopentyl glycol and an aliphatic dicarboxylic acid anhydride, and then neutralizing the resultant polyester with an amine compound to render the polyester hydrophilic.

(iii) Cross-linking Compound: C

Hexamethoxymethyl melamine (iv) Particles: D

Silica sol having an average particle size of 65 nm

<Composition of Coating Material>

PVA-based resin (A) 100% by weight

The concentration of the coating solution was 2% by weight.

Production Examples 4 to 7

PET Films F2 to F5

The same procedure as defined in Production Example 3 was conducted except that the composition of the coating material was varied as shown in Table 1, thereby obtaining PET films F2 to F5.

Properties of the thus obtained PET films are shown in Table 1.

Production Example 8

PET Film F6

The same procedure as defined in Production Example 3 was conducted except that the composition of the coating material was varied as shown in Table 1 and the coating amount thereof was 0.7 g/m² (after drying), thereby obtaining a PET film F6.

Properties of the thus obtained PET film are shown in Table 1.

Production Example 9

PET Film F7

The same procedure as defined in Production Example 3 was conducted except that the composition of the coating material was varied as shown in Table 1, thereby obtaining a PET film F7.

Properties of the thus obtained PET film are shown in Table 1.

Production Example 10

PET Film F8

The same procedure as defined in Production Example 3 was conducted except that the polyethylene terephthalate A1 was changed to the polyethylene terephthalate A2, thereby obtaining a PET film F8.

Properties of the thus obtained PET film are shown in Table 1.

Production Example 11

PET Film F9

After the unstretched film produced in Production Example 3 was coated with the same coating material as used in Production Example 3, the coated film was subjected to simultaneous biaxial stretching process at 95° C. and stretch ratios of 3.0 times in the MD direction and 4.0 times in the transverse (TD) direction using a Long's stretching machine manufactured by T. M. Long Co., Ltd. Thereafter, the thus stretched film was thermally set at 230° C., thereby obtaining a 25 μm-thick PET film F9 provided with a coating layer in an amount of 0.05 g/m² (after drying).

Properties of the thus obtained PET film are shown in Table 1.

Production Example 12

PET Film F10

The same procedure as defined in Production Example 3 was conducted except that a 1,000 mm-wide edge portion of the film was sampled, thereby obtaining a PET film F10.

Properties of the thus obtained PET film are shown in Table 1.

Production Example 13

PET Film F11

The same procedure as defined in Production Example 3 was conducted except that a 1,000 mm-wide intermediate portion of the film located between the central portion sampled in Production Example 3 and the edge portion sampled in Production Example 12 was sampled, thereby obtaining a PET film F11.

Properties of the thus obtained PET film are shown in Table 1.

TABLE 1

| Production Examples | Kind of films | Thickness (μm) | Composition of coating material (wt. %) | | | |
|---|---|---|---|---|---|---|
| | | | A | B | C | D |
| Production Example 3 | F1 | 25 | 100 | 0 | 0 | 0 |
| Production Example 4 | F2 | 25 | 80 | 0 | 20 | 0 |
| Production Example 5 | F3 | 25 | 70 | 15 | 10 | 5 |
| Production Example 6 | F4 | 25 | 20 | 70 | 10 | 0 |
| Production Example 7 | F5 | 25 | Uncoated | | | |
| Production Example 8 | F6 | 25 | 5 | 85 | 10 | 0 |
| Production Example 9 | F7 | 25 | 5 | 85 | 10 | 0 |
| Production Example 10 | F8 | 25 | 100 | 0 | 0 | 0 |
| Production Example 11 | F9 | 25 | 100 | 0 | 0 | 0 |
| Production Example 12 | F10 | 25 | 100 | 0 | 0 | 0 |

Example 1

A release layer having the following composition was formed in a coating amount of 0.1 g/m² (after drying) on the PET film F1 produced in Production Example 3, thereby obtaining a release film. Properties of the obtained release film are shown in Table 2.

| <Release agent composition> | |
|---|---|
| Curing-type silicone resin having a dimethyl polysiloxane structure ("KS-847H" produced by Shin-Etsu Kagaku Co., Ltd.; solid content: 30%) | 60% by weight |
| Curing agent ("PL-50T" produced by Shin-Etsu Kagaku Co., Ltd.; solid content: 1%) | 1% by weight |
| Silicone-based compound having Q siloxane structural units (reactive silicone resin; solid content: 30%) | 39% by weight |

The release agent composition was diluted with a mixed solvent of MEK and toluene (mixing ratio: 1:1) to prepare a coating solution having a concentration of 1.5% by weight.

Example 2

The same procedure as defined in Example 1 was conducted except that the release agent composition was changed to that shown below, thereby obtaining a release film. Properties of the obtained release film are shown in Table 2.

| <Release agent composition> | |
|---|---|
| Curing-type silicone resin having a dimethyl polysiloxane structure ("KS-847H" produced by Shin-Etsu Kagaku Co., Ltd.; solid content: 30%) | 89% by weight |
| Curing agent ("PL-50T" produced by Shin-Etsu Kagaku Co., Ltd.; solid content: 1%) | 1% by weight |
| Silicone-based compound having Q siloxane structural units (reactive silicone resin; solid content: 30%) | 10% by weight |

The release agent composition was diluted with a mixed solvent of MEK and toluene (mixing ratio: 1:1) to prepare a coating solution having a concentration of 1.5% by weight.

Example 3

The same procedure as defined in Example 1 was conducted except that the release agent composition was changed to that shown below, thereby obtaining a release film. Properties of the obtained release film are shown in Table 2.

| <Release agent composition> | |
|---|---|
| Curing-type silicone resin having a polysiloxane structure containing a phenyl group ("KS-774" produced by Shin-Etsu Kagaku Co., Ltd.; solid content: 30%) | 60% by weight |
| Curing agent ("PL-3" produced by Shin-Etsu Kagaku Co., Ltd.; solid content: 30%) | 1% by weight |
| Silicone-based compound having Q siloxane structural units (reactive silicone resin; solid content: 30%) | 39% by weight |

The release agent composition was diluted with a mixed solvent of MEK and toluene (mixing ratio: 1:1) to prepare a coating solution having a concentration of 1.5% by weight.

Example 4

The same procedure as defined in Example 1 was conducted except that the PET film F2 was used instead of the PET film F1, thereby obtaining a release film. Properties of the obtained release film are shown in Table 2.

Example 5

The same procedure as defined in Example 1 was conducted except that the PET film F3 was used instead of the PET film F1, thereby obtaining a release film. Properties of the obtained release film are shown in Table 2.

Example 6

The same procedure as defined in Example 1 was conducted except that the PET film F4 was used instead of the PET film F1, thereby obtaining a release film. Properties of the obtained release film are shown in Table 2.

Example 7

The same procedure as defined in Example 1 was conducted except that the PET film F6 was used instead of the PET film F1, thereby obtaining a release film. Properties of the obtained release film are shown in Table 2.

Example 8

The same procedure as defined in Example 1 was conducted except that the PET film F9 was used instead of the PET film F1, thereby obtaining a release film. Properties of the obtained release film are shown in Table 2.

Example 9

The same procedure as defined in Example 1 was conducted except that the PET film F11 was used instead of the PET film F1, thereby obtaining a release film. Properties of the obtained release film are shown in Table 2.

Comparative Example 1

The same procedure as defined in Example 4 was conducted except that the reactive silicone resin having Q siloxane structural units was not added to the release agent composition, thereby obtaining a release film. Properties of the obtained release film are shown in Table 2.

Comparative Example 2

The same procedure as defined in Example 1 was conducted except that the PET film F5 was used instead of the PET film F1, thereby obtaining a release film. Properties of the obtained release film are shown in Table 2.

Comparative Example 3

The same procedure as defined in Example 3 was conducted except that the release agent composition was varied as shown below, thereby obtaining a release film. Properties of the obtained release film are shown in Table 2.

| <Release agent composition> | |
|---|---|
| Curing-type silicone resin having a dimethyl polysiloxane structure ("KS-847H" produced by Shin-Etsu Kagaku Co., Ltd.; solid content: 30%) | 60% by weight |
| Curing agent ("PL-50T" produced by Shin-Etsu Kagaku Co., Ltd.; solid content: 1%) | 1% by weight |
| Silicone-based compound having Q siloxane structural units (reactive silicone resin; solid content: 30%) | 38% by weight |
| Non-reactive silicone oil ("X-22-819" produced by Shin-Etsu Kagaku Co., Ltd.; specific gravity: 0.99 at 25° C.) | 1% by weight |

The release agent composition was diluted with a mixed solvent of MEK and toluene (mixing ratio: 1:1) to prepare a coating solution having a concentration of 1.5% by weight.

Comparative Example 4

The same procedure as defined in Example 1 was conducted except that the PET film F7 was used instead of the PET film F1, thereby obtaining a release film. Properties of the obtained release film are shown in Table 2.

Comparative Example 5

The same procedure as defined in Example 1 was conducted except that the PET film F8 was used instead of the PET film F1, thereby obtaining a release film. Properties of the obtained release film are shown in Table 2.

Comparative Example 6

The same procedure as defined in Example 1 was conducted except that the PET film F10 was used instead of the PET film F1, thereby obtaining a release film. Properties of the obtained release film are shown in Table 2.

TABLE 2

| Examples and Comparative Examples | OL (mg/m$^2$) | TL (%) | TL(H) (%) | $\theta_3$ (°) |
|---|---|---|---|---|
| Example 1 | 0.2 | 87 | 1.2 | 90 |
| Example 2 | 0.4 | 87 | 1.2 | 90 |
| Example 3 | 0.3 | 87 | 1.2 | 90 |
| Example 4 | 0.3 | 87 | 1.2 | 90 |
| Example 5 | 0.4 | 87 | 1.2 | 90 |
| Example 6 | 0.6 | 87 | 1.2 | 90 |
| Example 7 | 0.3 | 87 | 1.2 | 90 |
| Example 8 | 0.2 | 87 | 1.2 | 90 |
| Example 9 | 0.2 | 87 | 5.5 | 75 |
| Comparative Example 1 | 1.7 | 87 | 1.2 | 90 |
| Comparative Example 2 | 1.0 | 87 | 1.2 | 90 |
| Comparative Example 3 | 0.4 | 87 | 1.2 | 90 |
| Comparative Example 4 | 0.8 | 87 | 1.2 | 90 |
| Comparative Example 5 | 0.2 | 65 | — | — |
| Comparative Example 6 | 0.2 | 87 | 14 | 60 |

| Examples and Comparative Examples | Residual adhesion rate (%) | Peel strength (mN/cm) | Extinction condition | Inspection easiness |
|---|---|---|---|---|
| Example 1 | 98 | 60 | None | Good |
| Example 2 | 98 | 24 | None | Good |
| Example 3 | 98 | 100 | None | Good |
| Example 4 | 98 | 60 | None | Good |
| Example 5 | 98 | 60 | None | Good |
| Example 6 | 98 | 60 | None | Good |
| Example 7 | 98 | 24 | None | Good |
| Example 8 | 98 | 60 | None | Good |
| Example 9 | 98 | 60 | None | Good |
| Comparative Example 1 | 98 | 14 | None | Poor |
| Comparative Example 2 | 98 | 60 | None | Slightly poor |
| Comparative Example 3 | 75 | 16 | None | Slightly poor |
| Comparative Example 4 | 98 | 60 | None | Slightly poor |
| Comparative Example 5 | 98 | 60 | Observed | Poor |
| Comparative Example 6 | 98 | 60 | Observed | Poor |

Production Example 14

Polyethylene terephthalate A3

A reactor was charged with 100 parts of dimethyl terephthalate, 60 parts of ethylene glycol and 0.09 part of magnesium acetate tetrahydrate, and the contents of the reactor were heated to distil off methanol therefrom, thereby conducting the transesterification reaction therebetween. Four hours after initiation of the transesterification reaction, the reaction mixture was heated to 230° C. to substantially terminate the transesterification reaction. Then, the reactor was further charged with 0.04 part of ethylene glycol slurry of ethyl acid phosphate, 0.01 part of germanium oxide and 0.1 part of silica particles having an average particle size of 1.54 um, and then the temperature of the reactor was increased to 280° C. and the pressure thereof was reduced to 15 mmHg, for 100 minutes. Successively, the pressure of the reactor was gradually reduced until it finally reached 0.3 mmHg. After 4 hours, the pressure of the reaction system was returned to ordinary pressure, thereby obtaining polyethylene terephthalate A3 having an intrinsic viscosity of 0.61.

Production Example 15

Polyethylene terephthalate A4

The same procedure as defined in Production Example 14 was conducted except that one part of titanium oxide particles having an average particle size of 0.27 μm were used instead of 0.1 part of the silica particles having an average particle size of 1.54 μm, thereby obtaining polyethylene terephthalate A4.

<Production of Biaxially Stretched Polyester Film>

Production Example 16

Polyester Film F12

The polyethylene terephthalate A3 produced in Production Example 14 was dried at 180° C. for 4 hours in an inert gas atmosphere, melted at 290° C. by an extruder, and then melt-extruded into sheet from an extrusion die so as to be attached onto a cooling roll whose surface temperature was set to 40° C., by an electrostatic adhesion method. The thus extruded sheet was cooled and solidified on the cooling roll, thereby obtaining an unstretched film. The thus obtained unstretched film was then stretched at 85° C. 3.5 times in the longitudinal (machine) direction. Then, a coating material having a composition as shown below was applied onto the monoaxially stretched film, and the resultant coated film was introduced into a tenter where the film was stretched at 100° C. 3.7 times in the transverse direction. The obtained film was thermally set at 230° C., thereby obtaining a 25 μm-thick PET film F12 provided with a coating layer having a thickness of 0.05 μm (after drying).

Compounds for forming the coating layer were as follows.

(i) PVA-based Resin: A

Polyvinyl alcohol having a percentage of saponification of 88 mol % and a degree of polymerization of 500

(ii) Water-based Polyester Resin: B

Water-based polyester obtained by copolymerizing polyester composed mainly of isophthalic acid, ethylene glycol and diethylene glycol with a dicarboxylic acid derivative having neopentyl glycol and an aliphatic dicarboxylic acid anhydride, and then neutralizing the resultant polyester with an amine compound to render the polyester hydrophilic.

(iii) Cross-linking Compound: C

Hexamethoxymethyl melamine (iv) Particles: D

Silica sol having an average particle size of 65 nm
<Composition of Coating Material<

PVA-based resin (A) 100% by weight

The concentration of the coating solution was 2% by weight.

Production Examples 17 to 20

PET Films F13 to F16

The same procedure as defined in Production Example 16 was conducted except that the composition of the coating material was varied as shown in Table 3, thereby obtaining PET films F13 to F16.

Properties of the thus obtained PET films are shown in Table 3.

Production Example 21

PET Film F17

The same procedure as defined in Production Example 16 was conducted except that the composition of the coating material was varied as shown in Table 3 and the coating amount thereof was 0.7 g/m² (after drying), thereby obtaining a PET film F17.

Properties of the thus obtained PET film are shown in Table 3.

Production Example 22

PET Film F18

The same procedure as defined in Production Example 16 was conducted except that the composition of the coating material was varied as shown in Table 3, thereby obtaining a PET film F18.

Properties of the thus obtained PET film are shown in Table 3.

Production Example 23

PET Film F19

The same procedure as defined in Production Example 16 was conducted to obtain a 38 μm-thick PET film F19 having a coating layer.

Properties of the thus obtained PET film are shown in Table 3.

Production Example 24

PET Film F20

The same procedure as defined in Production Example 16 was conducted to obtain a 6 μm-thick PET film F20 having a coating layer.

Properties of the thus obtained PET film are shown in Table 3.

Production Example 25

PET Film F21

The same procedure as defined in Production Example 16 was conducted to obtain a 75 μm-thick PET film F21 having a coating layer.

Properties of the thus obtained PET film are shown in Table 3.

Production Example 26

PET Film F22

The same procedure as defined in Production Example 16 was conducted except that the polyethylene terephthalate A4 was used instead of the polyethylene terephthalate A3, thereby obtaining a PET film F22.

Properties of the thus obtained PET film are shown in Table 3.

Production Example 27

Polyester Film F23

The polyethylene terephthalate A3 produced in Production Example 14 was dried at 180° C. for 4 hours in an inert gas atmosphere, melted at 290° C. by an extruder, and then melt-extruded into a sheet from an extrusion die so as to be attached onto a cooling roll whose surface temperature was set to 40° C., by an electrostatic adhesion method. The thus extruded sheet was cooled and solidified on the cooling roll, thereby obtaining an unstretched film.

The thus obtained unstretched film was coated with the same coating material as used in Production Example 16. Then, the coated film was introduced into a tenter where the film was dried at 80° C., thereby obtaining a 50 μm-thick PET film F23 provided with a coating layer having a thickness of 0.05 μm after drying.

Properties of the thus obtained PET film are shown in Table 3.

Production Example 28

PET Film F24

The same procedure as defined in Production Example 16 was conducted except that the stretch ratio in the machine direction was 5.0 times and the film was not stretched in the transverse direction, thereby obtaining a 50 μm-thick PET film F24 provided with a coating layer having a thickness of 0.05 μm after drying.

Properties of the thus obtained PET film are shown in Table 3.

TABLE 3

| Production Examples | Kind of films | Film thickness (μm) | Re (nm) | Composition of coating material (wt. %) PVA(A)/water-based resin (B)/cross-linking compound (C)/particles (D) |
|---|---|---|---|---|
| Production Example 14 | F12 | 25 | 700 | 100/0/0/0 |
| Production Example 15 | F13 | 25 | 700 | 80/0/20/0 |
| Production Example 16 | F14 | 25 | 700 | 70/15/10/5 |
| Production Example 17 | F15 | 25 | 700 | 20/70/10/0 |
| Production Example 18 | F16 | 25 | 700 | Uncoated |
| Production Example 19 | F17 | 25 | 700 | 5/85/10/0 |
| Production Example 20 | F18 | 25 | 700 | 5/85/10/0 |
| Production Example 21 | F19 | 38 | 990 | 100/0/0/0 |
| Production Example 22 | F20 | 6 | 180 | 100/0/0/0 |
| Production Example 23 | F21 | 75 | 2,200 | 100/0/0/0 |
| Production Example 24 | F22 | 25 | — | 100/0/0/0 |
| Production | F23 | 50 | 0 | 100/0/0/0 |

TABLE 3-continued

| Production Examples | Kind of films | Film thickness (μm) | Re (nm) | Composition of coating material (wt. %) PVA(A)/water-based resin (B)/cross-linking compound (C)/particles (D) |
|---|---|---|---|---|
| Example 25 Production Example 26 | F24 | 50 | 11,500 | 100/0/0/0 |

Example 10

A release layer having the following composition was formed on the oligomer precipitation-preventing layer of the PET film F12 produced in Production Example 16 such that the coating amount thereof was 0.1 g/m² (after drying), thereby obtaining a release film.

| <Release agent composition> | |
|---|---|
| Curing-type silicone resin ("KS-847H") produced by Shin-Etsu Kagaku Co., Ltd.) | 100 parts by weight |
| Curing agent ("PL-50T" produced by Shin-Etsu Kagaku Co., Ltd.) | 1 part by weight |
| Mixed solvent of MEK and toluene | 1,500 parts by weight |

Example 11

The same procedure as defined in Example 10 was conducted except that the PET film F13 was used instead of the PET film F12, thereby obtaining a release film.

Example 12

The same procedure as defined in Example 10 was conducted except that the PET film F14 was used instead of the PET film F12, thereby obtaining a release film.

Example 13

The same procedure as defined in Example 10 was conducted except that the PET film F15 was used instead of the PET film F12, thereby obtaining a release film.

Example 14

The same procedure as defined in Example 10 was conducted except that the PET film F15 was used instead of the PET film F12 and the release agent composition was varied as shown below, thereby obtaining a release film.

| <Release agent composition> | |
|---|---|
| Curing-type silicone resin ("KS-723A" produced by Shin-Etsu Kagaku Co., Ltd.) | 100 parts by weight |
| Curing-type silicone resin ("KS-723B" produced by Shin-Etsu Kagaku Co., Ltd.) | 25 parts by weight |
| Curing agent ("PS-3" produced by Shin-Etsu Kagaku Co., Ltd.) | 5 parts by weight |
| Mixed solvent of MEK and toluene | 1,500 parts by weight |

Example 15

The same procedure as defined in Example 10 was conducted except that the PET film F19 was used instead of the PET film F12, thereby obtaining a release film.

Example 16

The same procedure as defined in Example 10 was conducted except that the release agent composition was varied as shown below, thereby obtaining a release film.

| <Release agent composition> | |
|---|---|
| Curing-type silicone resin ("FSXK-2560" produced by Dow Corning Asia Co., Ltd.) | 35 parts by weight |
| Curing agent ("FSK-1638" produced by Dow Corning Asia Co., Ltd.) | 2 parts by weight |
| Mixed solvent of MEK and toluene | 1,400 parts by weight |

Example 17

The same procedure as defined in Example 10 was conducted except that the PET film F17 was used instead of the PET film F12, thereby obtaining a release film.

Comparative Example 7

The same procedure as defined in Example 10 was conducted except that the PET film F16 was used instead of the PET film F12, thereby obtaining a release film.

Comparative Example 8

The same procedure as defined in Example 10 was conducted except that the PET film F23 was used instead of the PET film F12, thereby obtaining a release film.

Comparative Example 9

The same procedure as defined in Example 10 was conducted except that the PET film F18 was used instead of the PET film F12, thereby obtaining a release film.

Comparative Example 10

The same procedure as defined in Example 10 was conducted except that the PET film F20 was used instead of the PET film F12, thereby obtaining a release film. However, the obtained release film suffered from wrinkles as a whole and, therefore, was practically unusable.

Comparative Example 11

The same procedure as defined in Example 10 was conducted except that the PET film F21 was used instead of the PET film F12, thereby obtaining a release film.

Comparative Example 12

The same procedure as defined in Example 10 was conducted except that the PET film F22 was used instead of the PET film F12, thereby obtaining a release film.

Comparative Example 13

The same procedure as defined in Example 10 was conducted except that the PET film F24 was used instead of the PET film F12, thereby obtaining a release film. However, the obtained release film exhibited poor surface conditions and, therefore, was practically unusable.

Properties of the respective release films obtained in Examples 10 to 17 and Comparative Examples 7 to 13 are shown in Table 4.

TABLE 4

| Examples and Comparative Examples | Film thickness (μm) | OL (mg/m²) | Re (nm) | TL (%) | Peel strength (gf/50 mm) |
|---|---|---|---|---|---|
| Example 10 | 25 | 0.5 | 700 | 87 | 7 |
| Example 11 | 25 | 0.5 | 700 | 87 | 7 |
| Example 12 | 25 | 0.5 | 700 | 87 | 7 |
| Example 13 | 25 | 0.6 | 700 | 87 | 7 |
| Example 14 | 25 | 0.5 | 700 | 87 | 20 |
| Example 15 | 38 | 0.5 | 990 | 87 | 7 |
| Example 16 | 25 | 0.5 | 700 | 87 | 10 |
| Example 17 | 25 | 0.5 | 700 | 87 | 7 |
| Comparative Example 7 | 25 | 2.2 | 700 | 87 | 7 |
| Comparative Example 8 | 50 | 0.5 | 0 | 85 | 7 |
| Comparative Example 9 | 25 | 1.8 | 700 | 87 | 7 |
| Comparative Example 10 | 6 | 0.4 | 180 | 87 | 7 |
| Comparative Example 11 | 75 | 0.5 | 2,200 | 86 | 7 |
| Comparative Example 12 | 50 | 0.5 | Unmeasurable | 65 | 7 |
| Comparative Example 13 | 50 | 0.5 | 11,500 | 87 | 7 |

| Examples and Comparative Examples | Residual adhesion rate (%) | Handling property | Extinction condition | Inspection easiness |
|---|---|---|---|---|
| Example 10 | 95 | Good | None | Good |
| Example 11 | 95 | Good | None | Good |
| Example 12 | 95 | Good | None | Good |
| Example 13 | 95 | Good | None | Good |
| Example 14 | 95 | Good | None | Good |
| Example 15 | 95 | Good | None | Good |
| Example 16 | 70 | Good | None | Good |
| Example 17 | 95 | Good | None | Good |
| Comparative Example 7 | 95 | Good | None | Slightly poor |
| Comparative Example 8 | 95 | Good | None | Poor |
| Comparative Example 9 | 95 | Good | None | Slightly poor |
| Comparative Example 10 | 95 | Poor | None | Poor |
| Comparative Example 11 | 95 | Poor | None | Good |
| Comparative Example 12 | 95 | Good | Observed | Poor |
| Comparative Example 13 | 95 | Good | Observed | Poor |

What is claimed is:

1. A release film comprising:

a polyester film;

a coating layer containing polyvinyl alcohol which is formed on one surface of said polyester film; and a release layer formed on a surface of said coating layer which exhibits a residual adhesion rate of not less than 80%, said release film satisfying all of the conditions represented by the following formulae (1) to (3):

$$OL \leq 0.6 \qquad (1)$$

$$TL \geq 80 \qquad (2)$$

$$TL(H) \leq 8 \qquad (3)$$

wherein OL is an amount in mg/m² of oligomers extracted with dimethylformamide from a surface of said release layer after the release film is heat-treated at a temperature of 180° C. for 10 minutes; TL is a total light transmittance (%) of said release film; and TL(H) is a total light transmittance (%) of a laminate prepared by interposing said release film between two polarizing plates disposed in a perpendicular relation to each other.

2. A release film according to claim 1, wherein the polyester film has an angle ($\theta_3$) of an in-plane main orientation axis relative to a machine direction (MD) of not less than 70°.

3. A release film according to claim 1, wherein said release layer contains a curing-type silicone resin.

4. A release film according to claim 1, wherein said release layer comprises a material having tetrafunctional siloxane structural units ($SiO_{4/2}$).

5. A release film for the protection of an adhesive layer formed on a polarizing plate for a liquid crystal display, comprising:

a biaxially stretched polyester film having a thickness of 9 to 50 μm;

a coating layer containing polyvinyl alcohol which is formed on a surface of said polyester film; and a release layer formed on a surface of said coating layer, said release film satisfying all of the conditions represented by the following formulae (1) to (3):

$$OL \leq 0.6 \qquad (1)$$

$$30 \leq Re \leq 10,000 \qquad (2)$$

$$TL \geq 80 \qquad (3)$$

wherein OL is an amount in mg/m² of oligomers extracted with dimethylformamide from a surface of said release layer after the release film is heat-treated at a temperature of 150° C. for 10 minutes; Re is a retardation value in nanometer (nm) of said biaxially stretched polyester film; and TL is a total light transmittance (%) of said release film.

6. A release film according to claim 5, wherein the amount of polyvinyl alcohol contained in said coating layer is in the range of 10 to 100% by weight.

7. A release film according to claim 5, wherein said release layer contains a curing-type silicone resin.

* * * * *